United States Patent Office 2,966,486
Patented Dec. 27, 1960

2,966,486

16α,17α-SUBSTITUTED METHYLENE DIOXY ETHERS OF STEROIDS OF THE PREGNANE SERIES AND METHOD OF PREPARING THE SAME

Leland L. Smith, New City, N.Y., and Michael Marx, Leonia, N.J., assignors to American Cyanamid Company, New York, N.Y., a corporation of Maine No Drawing. Filed Mar. 20, 1959, Ser. No. 800,640

12 Claims. (Cl. 260—239.55)

This invention relates to new steroid compounds. More particularly, it relates to 16α,17α-substituted methylenedioxy ethers of steroids of the pregnane series and method of preparing the same.

In the past, it is known to prepare 16α,17α-isopropylidenedioxy pregnanes from the corresponding 16α,17α-dihydroxy pregnane [Journal of the Chemical Society, 4373, (1955)].

We have now found a new class of steroid esters which have high glucocorticoid activity. These esters can be illustrated by the following structural formula:

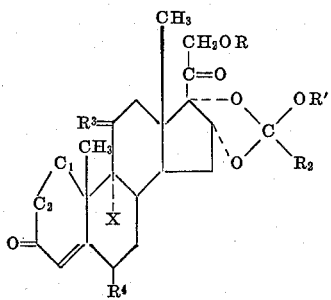

in which R is a member of the group consisting of hydrogen and lower alkanoyl radicals, R' is a lower alkyl radical, $R_2$ is a member of the group consisting of hydrogen and lower alkyl radicals, $R^3$ is a member of the group consisting of

and O= groups, $R^4$ is a member of the group consisting of hydrogen, halogen and methyl radicals, X is a member of the group consisting of hydrogen and halogen atoms and —$C_1$—$C_2$— is a member of the group consisting of

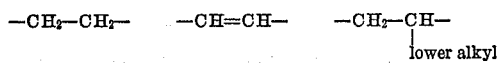

and

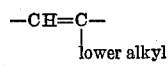

groups.

The compounds of the present invention are insoluble in water and somewhat soluble in the usual organic solvents. They are generally crystalline solids having relatively high melting points.

The compounds of the present invention are prepared by the reaction of a vicinal cis-dihydroxy steroid having the following structure:

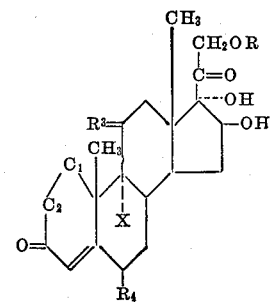

in which R, $R^3$, $R^4$, X and —$C_1$—$C_2$— are as defined above, with an ortho ester having the formula $$R^2C(OR')_3$$

in which R' and $R^2$ are as defined above. The reaction is preferably carried out by adding the steroid to the ortho ester and allowing the reaction to take place in the presence of a mineral acid. The reaction is usually carried out at a temperature within the range of from about 15° to about 60° C. It is usually complete within a period of from a few minutes to about an hour.

After the formation of the 16α,17α-cyclic ortho-ester on the steroid nucleus, other transformations can be made, such as conversion of the 21-hydroxymethylene group into a lower alkanoyloxy-methylene group by reaction with a lower alkanoic acid anhydride or chloride. Among the suitable reagents can be mentioned acetic anhydride, propionic anhydride, butyric anhydride, acetyl chloride, propionyl chloride and the like.

The 16α,17α-cyclic ortho-esters of this invention display improved stability towards alkali in comparison with the ordinary 16α,21-diesters of the steroids involved. Whereas alkaline conditions are sufficient to remove easily and completely the 16α- and 21-acetate ester groups, it is often possible to show that the cyclic ortho-esters of this invention are not completely hydrolyzed, even under extended hydrolysis conditions.

The starting steroids utilizable in the process of the present invention can be, for example, 9α-fluoro-11β,16α,17α,21-tetrahydroxy-1,4-pregnadiene-3,20-dione; 9α-fluoro-11α,16α,17α,21 - tetrahydroxy - 4 - pregnene - 3,20-dione; 11β,16α,17α,21-tetrahydroxy-4-pregnene-3,20-dione; 9α-chloro-11β,16α,17α,21-tetrahydroxy-4-pregnene-3,20-dione; 9α-fluoro - 11β,16α,17α,21 - tetrahydroxy-6α-methyl - 1,4 - pregnadiene-3,20-dione; 6α-chloro-11β,16α,17α,21-tetrahydroxy-4-pregnene-3,20-dione; 6α,9α-difluoro-11β,16α,17α,21 - tetrahydroxy - 4 - pregnene - 3,20-dione; 11β,16α,17α,21-tetrahydroxy-2-methyl-1,4-pregnadiene-3,20-dione, 11β,16α,17α,21-tetrahydroxy-1,4-pregnadiene-3,20-dione; 16α,17α,21-trihydroxy-1,4-pregnadiene-3,11,20-trione; 9α-chloro - 11β,16α,17α,21 - tetrahydroxy-1,4-pregnadiene-3,20-dione; 21-acetoxy-9α-chloro-11β,16α,17α-trihydroxy-4-pregnene-3,20-dione; 9α-fluoro-11β,16α,17α,21 - tetrahydroxy - 2α - methyl-4-pregnene-3,20-dione; 11β,16α,16α,21-tetrahydroxy - 2α - methyl-4-pregnene-3,20-dione, and the like. The above steroids are described in Australian Patents 35,844/58 and 35,932/58 along with Belgian Patent No. 570,495. Some of the compounds are also described in U.S. Patents 2,838,546 and 2,838,548.

The other starting material, ortho ester, can be compounds such as ethyl ortho formate, ethyl ortho acetate, methyl ortho propionate, methyl ortho acetate, methyl ortho formate, and the like.

The compounds of the present invention are physiologically active possessing glucocorticoid and anti-inflammatory activity. They can be used systemically and topically in the treatment of rheumatoid arthritis, burns, allergies, psoriasis and other skin disorders.

In the present application, the term lower alkanoyl is intended to cover derivatives of alkanoic acids having 1–6 carbon atoms. The term halogen covers bromine, chlorine, iodine and fluorine. The temperatures are on the centigrade scale unless otherwise indicated.

The following examples describe the present invention in greater particularity and are intended to be by way of illustration and not limitation.

EXAMPLE 1

16α,17α-ethoxymethylidenedioxy-9α-fluoro-11β,21-dihydroxy-1,4-pregnadiene-3,20-dione One gram of 9α-fluoro-11β,16α,17α,21-tetrahydroxy-1,4-pregnadiene-3,20-dione, J. Am. Chem. Soc. 78, 5693 (1956), is slurried in 50 ml. of ethyl ortho-formate and 0.3 ml. of 70% perchloric acid is added. An immediate yellow color appears and the solids dissolve. The colored solution is neutralized with 8 ml. of saturated aqueous sodium bicarbonate solution, at which point the deep color diminishes, and inorganic salts precipitate. The solvent layer is decanted from the precipitate and concentrated under reduced pressure to a gum. The gum is dissolved in chloroform, the chloroform solution dried over anhydrous magnesium sulfate and adsorbed onto silica gel. Elution of the steroid from the silica gel is accomplished with ethyl acetate; the eluates evaporated yields a residue which is crystallized from methylene chloride. The product obtained is a mixture of two components as evidenced by paper chromatograms. Rechromatography on silica gel yields the ester in the chloroform/ethyl acetate (80:20) eluates. Recrystallization from acetone/petroleum ether yields 545 mg. of crystals.

$\lambda_{max.}^{EtOH}$ 239 m$\mu$. ($\epsilon$15,170; [$\alpha$] $_D^{22}$ +121.2° (0.5% in MeOH))

EXAMPLE 2

16α,17α-(1-ethoxyethylidenedioxy)-9α-fluoro-11β,21-dihydroxy-1,4-pregnadiene-3,20-dione One gram of 9α-fluoro-11β,16α,17α,21-tetrahydroxy-1,4-pregnadiene-3,20-dione is suspended in 50 ml. of ethyl ortho-acetate and 0.30 ml. of 70% perchloric acid is added. After 30 minutes shaking the mixture is neutralized with 8 ml. of saturated aqueous sodium bicarbonate solution and 30 ml. of water is added. The mixture is concentrated under reduced pressure until most of the organic solvent has been removed, and the resulting concentrate is extracted with methylene chloride. The dried methylene chloride extracts are decolorized with activated charcoal, filtered, and evaporated to dryness under reduced pressure. The residue is dissolved in chloroform and adsorbed onto silica gel. Elution from silica gel is accomplished with chloroform containing 20% ethyl acetate. The eluates are concentrated to dryness under reduced pressure and the residue is crystallized from acetone/petroleum ether, yielding the crystalline ortho-ester. $\lambda_{max.}$ 238 m$\mu$. ($\epsilon$15,150).

EXAMPLE 3

16α,17α-methoxymethylidenedioxy-9α-fluoro-11β,21-dihydroxy-1,4-pregnadiene-3,20-dione One gram of 9α-fluoro-11β,16α,17α,21-tetrahydroxy-1,4-pregnadiene-3,20-dione is slurried in 30 ml. of methyl ortho-formate and 0.30 ml. of 70% perchloric acid is added. A deep red coloration is produced. After ten minutes the reaction mixture is neutralized with saturated aqueous sodium bicarbonate solution (8 ml.), and the resulting solids are filtered. The filtrate is diluted with 20 ml. of water and concentrated under reduced pressure to remove the organic solvent. From the aqueous mixture a gum is recovered which yields 515 mg. of crystals of the desired ortho-ester. [$\alpha$]$_D^{22}$ +127°; $\lambda_{max}$, 238 m$\mu$. ($\epsilon$15,700).

EXAMPLE 4

16α,17α-(1-methoxyethylidenedioxy)-9α-fluoro-11β,21-dihydroxy-1,4-pregnadiene-3,20-dione One gram of 9α-fluoro-11β,16α,17α,21-tetrahydroxy-1,4-pregnadiene-3,20-dione is slurried in 30 ml. of methyl ortho-acetate and 0.30 ml. of 70% perchloric acid is added. After working up in the usual way, the pure ortho-ester is obtained. [$\alpha$]$_D^{22}$ +122.9°; $\lambda_{max.}$ 238 m$\mu$ ($\epsilon$15,400).

EXAMPLE 5

16α,17α-(1-methoxypropylidenedioxy)-9α-fluoro-11β,21-dihydroxy-1,4-pregnadiene-3,20-dione To a suspension of 750 mg. of 9α-fluoro-11β,16α,17α,21-tetrahydroxy-1,4-pregnadiene-3,20-dione in 15 ml. of methyl ortho-propionate is added 0.20 ml. of 70% perchloric acid. After neutralization and isolation in the usual manner, the ortho-ester is recovered. After recrystallization from petroleum ether/acetone the pure ortho-ester is obtained. [$\alpha$]$_D$ +111.0°; $\lambda_{max.}$ 238 m$\mu$. ($\epsilon$15,150).

EXAMPLE 6

16α,17α-(1-methoxyethylidenedioxy)-9α-fluoro-11β,21-dihydroxy-4-pregnene-3,20-dione To a suspension of 1.0 g. of 9α-fluoro-11β,16α,17α,21-tetrahydroxy-4-pregnene-3,20-dione, J. Am. Soc. 78, 5693 (1956), in 50 ml. of methyl ortho-acetate is added 0.30 ml. of 70% perchloric acid. After ten minutes the reaction mixture is processed in the usual way to yield the pure ortho-ester.

EXAMPLE 7

16α,17α-ethoxymethylidenedioxy-11β,21-dihydroxy-4-pregnene-3,20-dione

To a suspension of 16α-hydroxyhydrocortisone, J. Am. Chem. Soc. 78, 1909 (1956), in 50 ml. of ethyl ortho-formate is added 0.3 ml. of perchloric acid. The reaction is terminated after fifteen minutes and worked up in a manner described in the preceding examples, yielding 16α,17α-ethoxymethylidenedioxy - 11β,21 - dihydroxy-4-pregnene-3,20-dione.

EXAMPLE 8

16α,17α-ethoxymethylidenedioxy-21-hydroxy-4-pregnene-3,11,20-trione

One gram of 16α-hydroxycortisone, J. Am. Chem. Soc. 78, 1909 (1956), is suspended in 50 ml. of ethyl ortho-formate and 0.30 ml. of concentrated hydrochloric acid is added. After thirty minutes the reaction mixture is neutralized and extracted in the usual way. After chromatography the pure ortho-ester is isolated.

EXAMPLE 9

9α-chloro-16α,17α-ethoxymethylidenedioxy-11β,21-dihydroxy-4-pregnene-3,20-dione

To a suspension of 0.5 g. of 9α-chloro-16α-hydroxyhydrocortisone, J. Am. Chem. Soc. 78, 5693 (1956), in 30 ml. of ethyl ortho-formate is added 0.15 ml. of perchloric acid. After fifteen minutes the mixture is neutralized with 4 ml. of saturated aqueous sodium bicarbonate solution and the mixture processed as described in the preceding examples to give the pure ortho-ester.

EXAMPLE 10

21 - acetoxy-16α,17α-ethoxymethylidenedioxy-9α-fluoro-11β-hydroxy-1,4-pregnadiene-3,20-dione One hundred milligrams of 16α,17α-ethoxymethylidenedioxy - 9α-fluoro-11β,21-dihydroxy-1,4-pregnadiene-3,20-dione from Example 1 is dissolved in 0.5 ml. of dry pyridine and 0.1 ml. of acetic anhydride is added. After standing over night, the reaction is terminated by adding methanol. The solvents are removed under reduced pressure and fresh methanol and toluene are added and evaporation repeated until the odor of pyridine is removed. The residue so obtained is crystallized from acetone-petroleum ether and is homogeneous on paper chromatograms. $\lambda_{max}$. 238 m$\mu$. ($\epsilon$15,620).

EXAMPLE 11

16α,17α - ethoxymethylidenedioxy-9α-fluoro-11β,21-dihydroxy-6α-methyl-1,4-pregnadiene-3,20-dione One hundred milligrams of 9α-fluoro 11β,16α,17α, 21-tetrahydroxy - 6α-methyl-1,4-pregnadiene-3,20-dione (U.S. Patent 2,831,003) is suspended in 5 ml. of ethyl ortho-formate and a few drops of 70% perchloric acid is added. The colored solution so formed is then neutralized with saturated sodium bicarbonate solution and filtered from insolubles. The filtrate is concentrated in vacuum to remove organic solvent, and the precipitated solids are recovered and crystallized from acetone/petroleum ether. After several recrystallizations the pure 6α-methyltriamcinolone 16α,17α-ethyl ortho-formate derivative is obtained. The compound is characterized by infrared spectra as an ortho-ester and contains bands distinctive of the $\Delta^{1,4}$-3-ketone grouping.

EXAMPLE 12

6α - chloro - 16α,17α-(1-ethoxyethylidenedioxy)-11β,21-dihydroxy-4-pregnene-3,20-dione One hundred milligrams of 6α-chloro-16α-hydroxy-hydrohydrocortisone (Belgian Patent No. 570,495) is suspended in 5 ml. of ethyl ortho-acetate and a drop of 70% perchloric acid is added. After a few minutes the solution is neutralized with bicarbonate solution and the insolubles filtered. The filtrate is concentrated under reduced pressure to remove organic solvent; the precipitated solids are filtered and washed with water. The solids analyze on paper chromatograms as the desired 16α,17α-ortho-ester. After chromatography on silica gel and several recrystallizations from acetone/petroleum ether the pure crystalline ortho-ester is recovered.

EXAMPLE 13

6α,9α - difluoro - 16α,17α-methoxymethylidenedioxy-11β, 21-dihydroxy-4-pregnene-3,20-dione One gram of 6α,9α-difluoro-16α-hydroxy-hydrocortisone (U.S. Patent 2,838,548) is slurried in 30 ml. of methyl ortho-formate and 0.3 ml. of 70% perchloric acid is added. The solution so formed is neutralized with bicarbonate and worked up in the usual manner according to the other examples. After chromatography on silica gel and several recrystallizations the pure ortho-ester is obtained.

EXAMPLE 14

16α,17α - ethoxymethylidenedioxy - 11β,21 - dihydroxy 2α-methyl-1,4-pregnadiene-3,20-dione One gram of 2-methyl-16α-hydroxyprednisolone, J. Am. Chem. Soc. 81, 1696 (1959), is slurried in 50 ml. of ethyl ortho-formate and 0.3 ml. of 70% perchloric acid is added. After a few minutes the solution is processed in the usual manner to obtain a crude solid product, which after chromatography on silica gel and several recrystallizations from acetone with petroleum ether, has constant properties characteristic of the 16α,17α-ortho-ester.

We claim:

1. A compound having the formula

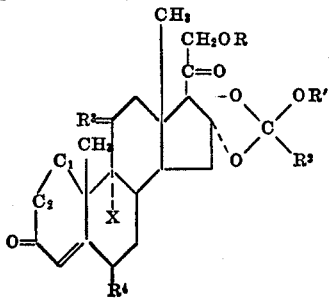

in which R is a member of the group consisting of hydrogen and lower alkanoyl radicals, R' is a lower alkyl radical, R² is a member of the group consisting of hydrogen and lower alkyl radicals, R³ is a member of the group consisting of

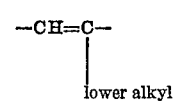

and O= group, R⁴ is a member of the group consisting of hydrogen, halogen and methyl radicals, X is a member of the group consisting of hydrogen and halogen atoms and —C₁—C₂— is a member of the group consisting of —CH₂—CH₂—;

—CH=CH—  —CH₂—CH—
              |
              (2α)
              lower alkyl and —CH=C—
   |
   lower alkyl groups.

2. The compound 16α,17α - ethoxymethylidenedioxy-9α-fluoro-11β,21-dihydroxy-1,4-pregnadiene-3,20-dione.

3. The compound 16α,17α-(1-ethoxyethylidenedioxy)-9α - fluoro - 11β - 21-dihydroxy-1,4-pregnadiene-3,20-dione.

4. The compound 16α,17α-methoxymethylidenedioxy-9α - fluoro - 11β,21 - dihydroxy - 1,4-pregnadiene-3,20-dione.

5. The compound 16α,17α - (1-methoxyethylidenedioxy) - 9α - fluoro - 11β,21-dihydroxy-1,4-pregnadiene-3,20-dione.

6. The compound 16α,17α-(1-methoxypropylidenedioxy) - 9α-fluoro-11β,21-dihydroxy-1,4-pregnadiene-3,20-dione.

7. The compound 21-acetoxy-16α,17α-ethoxymethylidenedioxy - 9α-fluoro-11β-hydroxy-1,4-pregnadiene-3,20-dione.

8. A method of preparing compounds having the general formula

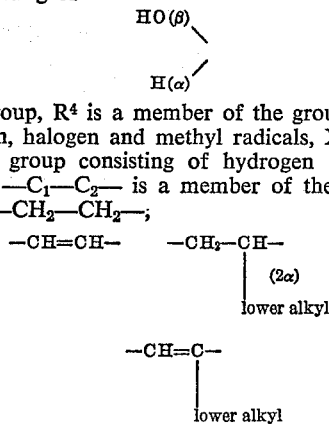

in which R is a member of the group consisting of hydrogen and lower alkanoyl radicals, R' is a lower alkyl radical, R² is a member of the group consisting of hydrogen and lower alkyl radicals, R³ is a member of the group consisting of

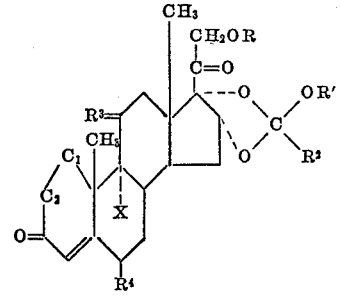

and O= group, R⁴ is a member of the group consisting of hydrogen, halogen and methyl radicals and

—C₁—C₂— is a member of the group consisting of —CH₂—CH₂—, —CH=CH—,

—CH₂—CH—
   |
   (2α)
   lower alkyl and

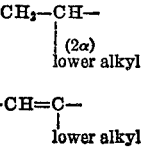

groups, which comprises contacting the corresponding 16α,17α-dihydroxy steroid with an ortho-ester having the formula R²C(OR')₃ in which R' and R² are as defined above at a temperature within the range of about 15° to about 60° C. in the presence of a mineral acid.

9. The process according to claim 8 wherein the 16α,17α-dihydroxy steroid is 9α-fluoro-11β,16α,17α,21-tetrahydroxy-1,4-pregnadiene-3,20-dione.

10. The process according to claim 8 where the ortho-ester is ethyl ortho-formate.

11. The process according to claim 8 where the ortho-ester is methyl ortho-formate.

12. The process according to claim 8 where the ortho-ester is ethyl ortho-acetate.

References Cited in the file of this patent

UNITED STATES PATENTS

| | | |
|---|---|---|
| 2,584,271 | Huffman | Feb. 5, 1952 |
| 2,736,732 | Knowles | Feb. 28, 1956 |
| 2,831,003 | Thomas | Apr. 15, 1958 |

OTHER REFERENCES

Ellis et al.: J. Chem. Soc. (December 1955), pages 4383–4388.

Fried et al.: J. Am. Chem. Soc., vol. 80 (May 5, 1958), pages 2338 and 2339.

UNITED STATES PATENT OFFICE
Certificate of Correction

Patent No. 2,966,486                                                  December 27, 1960

Leland L. Smith et al.

It is hereby certified that error appears in the above numbered patent requiring correction and that the said Letters Patent should read as corrected below.

Column 1, lines 35 to 41, column 5, lines 70 to 75, and column 6, lines 49 to 55, the lower left-hand portion of the formulas, each occurrence, should appear as shown below instead of as in the patent:

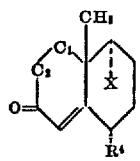

column 2, lines 3 to 15, the formula should appear as shown below instead of as in the patent:

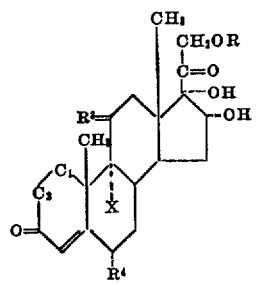

column 6, lines 15 to 18, the right-hand portion of the formula should appear as shown below instead of as in the patent:

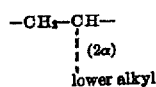

Signed and sealed this 27th day of June 1961.

[SEAL]

Attest:
ERNEST W. SWIDER,
*Attesting Officer.*

DAVID L. LADD,
*Commissioner of Patents.*